May 17, 1949.   A. G. THOMAS   2,470,532
ELECTRIC IRON WITH THERMOKINETIC SWITCH
Filed Aug. 14, 1943   2 Sheets-Sheet 1

Albert G. Thomas
INVENTOR

May 17, 1949.                    A. G. THOMAS                    2,470,532
                    ELECTRIC IRON WITH THERMOKINETIC SWITCH
Filed Aug. 14, 1943                                         2 Sheets-Sheet 2
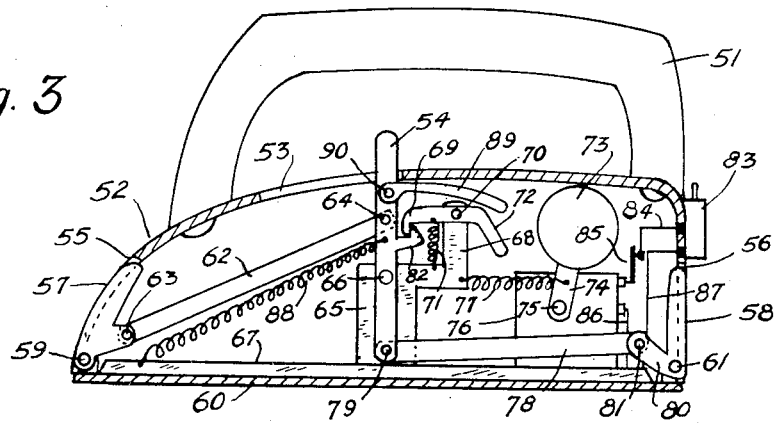
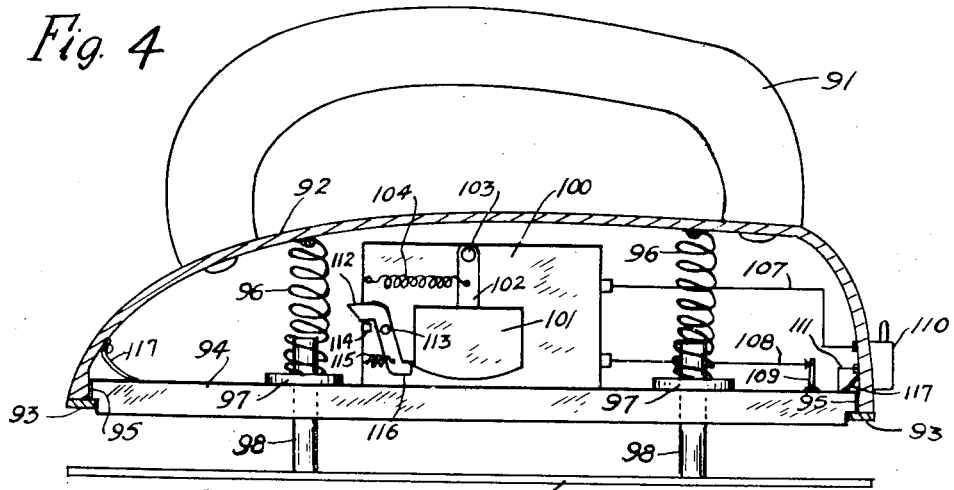
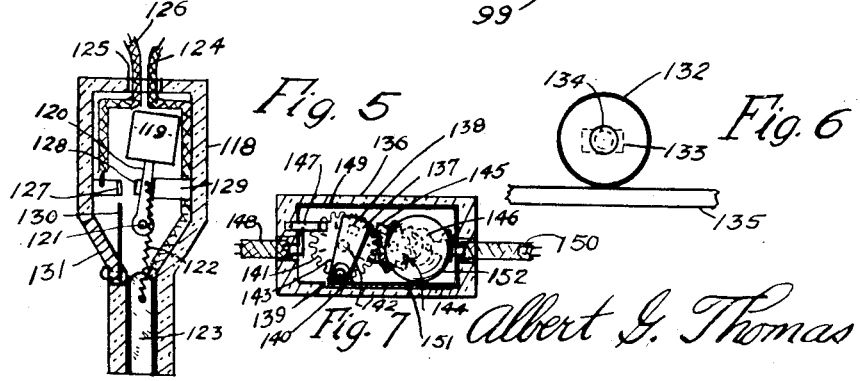
Albert G. Thomas
INVENTOR Patented May 17, 1949

2,470,532

UNITED STATES PATENT OFFICE 2,470,532

ELECTRIC IRON WITH THERMOKINETIC SWITCH

Albert G. Thomas, Lynchburg, Va.

Application August 14, 1943, Serial No. 498,621

8 Claims. (Cl. 219—25)

This invention relates to electric irons and other devices and is a continuation-in-part of my co-pending application, Serial No. 446,685, filed June 12, 1942 issued August 14, 1945 as Patent No. 2,382,587.

An object is to provide an electric iron that will maintain the current connection to its heating element as long as the iron is kept in movement, from use, but which will break the current connection if the iron is left stationary for a period longer than a predetermined interval. In this way fires can be prevented and scorched or burned ironing boards will be obviated.

Another object is to provide an iron with an automatic current cut-off, depending upon movement of the iron and also with a thermostatic current cut-off.

A further object is to provide an iron with an automatic cut-off, depending upon movement of the iron, and also with a thermostatic cut-off, the latter dominating the former so that movement of the iron will not close the circuit of the heating element if the iron is hotter than a predetermined temperature as determined by the setting of thermostat.

An additional object is the provision of the above features in combination with an adjustable thermostat.

Another object is to provide an iron with the above described characteristics, of simple and practical construction, so that it will stand up under long usage and yet will be cheap to manufacture.

A further object is the provision of an electric iron that will lift its sole plate above an ironing board or other supporting surface, after an interval, if it is left stationary and in ironing position.

Another object is to provide an electric iron that will lift itself above its supporting surface after being left stationary for an interval, and which will also cut off the current to the heating unit.

A still further object is the provision of an electric iron that will lift its heating unit above its ironing surface, if left stationary for an interval.

An additional object is to provide an attachment for electric irons, which will automatically cut off the current to the heating element if the iron is left stationary for an excessive interval.

Other objects will appear in the specification.

In the drawings:

Figure 3 is a side elevation, in part section, of an electric iron which lifts its bottom surface above an ironing board or other support, after being left stationary for a predetermined time interval.

Figure 4 is a side elevation, in part section, of an electric iron which lifts its heating unit above its ironing bottom plate, if left stationary for a predetermined time interval.

Figure 5 is a side elevation, in part section, of a connection plug for an electric iron, the plug having a switch which automatically cuts off the current to the iron, if left stationary for an excessive interval as determined by a thermostat or other timing device.

Figure 6 is an end view of an inertia operated roller weight attached to the arm of a switch for an electric iron.

Figure 7 is a longitudinal part sectional view of an automatic switch cut-off for an electric iron, adapted to be connected into the cord circuit. This switch is escapement-controlled so that its operation is independent of the temperature of the iron.

Figure 1:
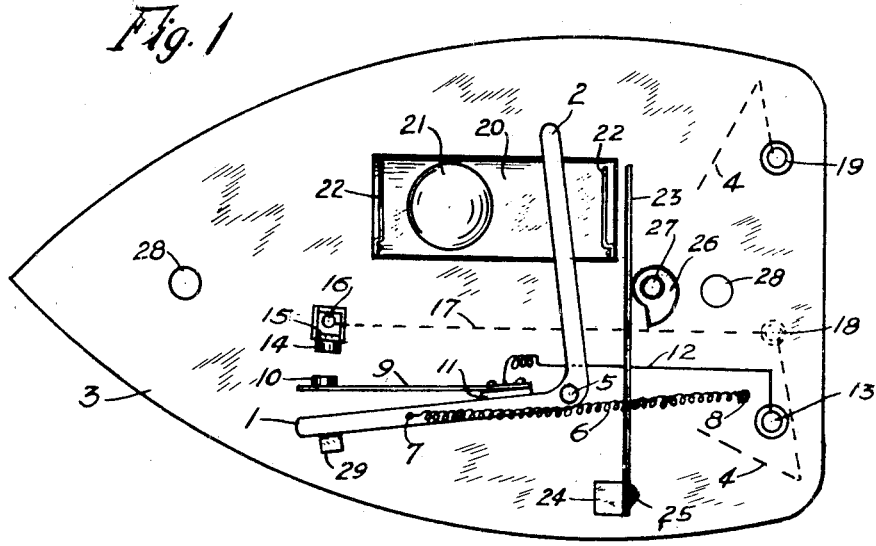
Figure 1 is a top plan view of the inner base or weight of an electric iron, showing automatic cut-off mechanism for the heating element switch.

In Figure 1, integral arms 1 and 2 are pivoted to swing horizontally above weight or plate 3 of the iron which contains the heating element 4, shown in fragmentary manner. Pivot pin 5 is passed through a suitable bore at the junction of arms 1 and 2 and is threaded into a hole in weight 3, or otherwise fastened. One end of tension spring 6 is fastened to arm 1 by means of a hole or pin 7 and the other end is similarly fastened to weight 3 or to another support at point 8. Flexible metal strip 9 with attached electrical contact 10 is riveted or otherwise fastened to arm 1, with mica or other suitable insulation 11 intervening. One end of wire 12 is flexibly connected to strip 9 and the other end leads to terminal post 13 suitably insulated from weight 3 by mica or otherwise. Electrical contact 14, mounted on bracket 15 which is fastened to weight 3 by means of screw 16 or in any suitable manner, is insulated from the weight and is connected with insulated conductor 17 leading to insulated connection post 18 to which is connected one end of heating wire or element 4 which also is insulated from the metal of the iron.

Conductor or wire 17 is shown as being placed in or beneath weight 3 but it may be fastened above it. The other end of heating wire 4 is connected to insulated terminal post 19 supported on weight 3. Current may be supplied to the heating element 4 by a connection plug having current connections making contact with elements 13 and 19.

Recess or trough 20 is provided in weight 3 so that ball 21, preferably rather heavy, can roll lengthwise therein. This ball is of such size that it will strike arm 2 as it rolls in rearward direction. While recess 20 is shown it is obvious that it is not essential as ball 21 may be guided to roll on the surface of weight 3 by means of a raised U shaped or rectangular boundary strip fastened to the weight. Flexible spring strips 22 are fastened to the weight at either end of the trough 20 to act as flexible buffers for the ball, to reduce noise.

Bimetal strip 23 is fastened at one end to block 24, integral with or fastened to weight 3, by means of screw 25. Cam 26, fastened to rod 27 having rotary bearing in a suitable bore or hole in weight 3, serves as a stop for bimetal strip 23 which is urged in rearward direction by its own resiliency. Rod 27 is extended vertically and passes through a hole in the cover, not shown, of the iron so that the cam may be rotated to place strip 23 nearer to or further from arm 2 as desired. A suitable indexed knob may be fastened to the upper end of rod 27 and this knob may be rotated relative to a temperature or other scale placed on the outside of the cover. Friction means may be provided to hold rod 27 in any set position. The proximity of strip 23 to arm 2 for any given strip, determines the temperature at which the switch will be opened.

Threaded holes 28 may be provided in weight 3 so that the cover and handle may be attached by means of bolts or screws. Stop 29 against which switch arm 1 is pulled by spring 6, when the switch is in open position, is fastened to weight 3 or is integral therewith.

Fastening point 8 is so positioned that spring 6 will lie to one side of pivot 5 when arm 1 rests against stop 29 and lies on the other side of pivot 5 when arm 1 is moved toward contact 14 sufficiently. When this happens contact 10 touches contact 14 so that current is supplied to heating element 4.

In operation, if the switch is in open circuit position as shown and if the iron is cold so that bimetal strip 23 is in the position indicated the switch may be closed by standing the iron on its rear end so that the weight of ball 21 will force arm 2 down to bring arm 1 toward contact 14 so that spring 6 will pass over pivot 5 and contact 10 will be pressed against contact 14. Or, the iron may be moved forward and backward rapidly for a few strokes so that ball 21 will roll against arm 2 and will move it rearward to cause the snap action of the switch to close the circuit. When this happens arm 2 will be carried nearer to strip 23.

When the iron reaches a predetermined temperature, dependent upon the setting of cam 26, bimetal strip 23 will have bent to the left sufficiently to strike arm 2. When this happens the heating circuit will not be immediately broken, on account of the flexibility of strip 9, but current will continue to energize heating element 4 until arm 1 has been moved toward stop 29 a sufficient distance for spring 6 to cross over pivot 5 and so to snap arm 1 against stop 29. Contact 10 is then separated from contact 14 and the heating circuit is broken. This arrangement is provided so that the iron will not cool down sufficiently to withdraw the bimetal from arm 2 before the switch is snapped open. If thermostatic element 23 is a snapping disc or similar type giving quick appreciable movement in one direction or the other, then flexible strip 9 would not be needed and contact 10 can be fastened to an insulated support on arm 1.

When the switch is opened by the thermostat it will remain open as long as the iron remains stationary. The iron will then cool and strip 23 will return to the starting position shown. If, however, the iron is given normal movement of use, ball 21 will be caused to roll back and forth in trough 20 so that the ball will strike arm 2 and will knock it rearward, with the result that arm 1 will be carried toward contact 14 and spring 6 will snap over pivot 5 to bring contact 10 against contact 14 to close the heating circuit.

Bimetal strip 23 is preferably of such strength or rigidity that it will prevent closing of the switch, due to action of the ball, unless the temperature of the iron is below the value as determined by the position of cam 26. This can be true even if the iron is turned up on end.

While tension spring 6 is shown, it is obvious that a form of compression spring or a flat spring pressing against plane surfaces on the junction of arms 1 and 2, can be used. The cover or any other suitable guard can prevent ball 21 from falling out of trough 20 if the iron is turned on end.

If the user leaves this iron in ironing position for a period longer than a safe interval, then the switch will be automatically opened, to prevent fires or burned boards or the like. If, however, the iron is kept in forward and backward movement, as in normal use, then the action of ball 21 on arm 2 will keep the switch closed, as long as the temperature of the iron is below that set by the thermostat.

Figure 2:
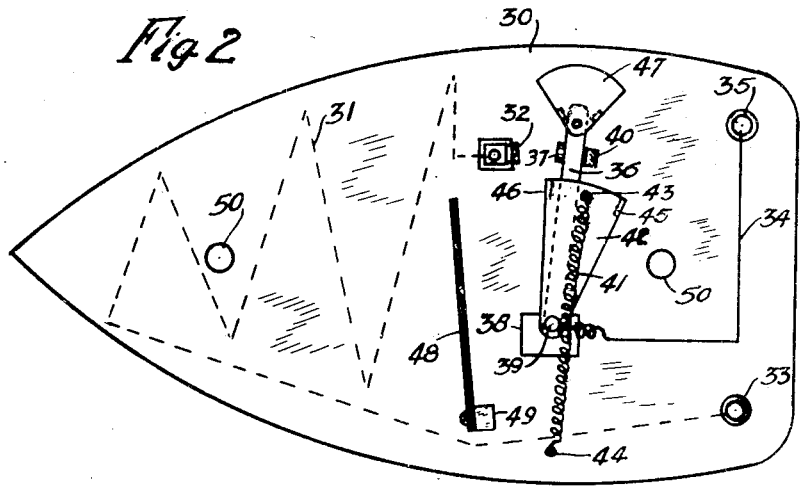
Figure 2 is a view similar to that of Figure 1, but showing an alternative construction.

In Figure 2, iron weight 30 contains heating element 31 one end of which is connected to insulated contact 32 and the other end of which is connected to insulated terminal 33. Wire 34 connects the other terminal 35 with metal arm 36 through a flexible connection. This arm carries contact 37 and is pivoted to block 38 by pin or screw 39. Block 38 and stop 40 are fastened to and are insulated from weight 30. Tension spring 41 is fastened to sector 42 at point 43 and the other end of the spring is fastened to weight 30 at point 44. Spring 41 may be insulated from weight 30 or sector 42 may be of insulating material such as a heat resistant ceramic. Lugs 45 and 46 depend from sector 42 and are adapted to strike arm 36 at the end of travel of sector 42 in either direction.

Weight 47, which may be fixed to the end of arm 36 or pivoted to it with a lost motion connection as shown, serves to force arm 36 forward during use of the iron, due to momentum of the weight, so that spring 41 will snap over to the left of pivot 39 and lug 45 will press arm 36 to the left to force contact 37 against contact 32 to close the heating circuit. If the temperature becomes excessive, bimetal strip 48 fastened to support 49, will bend and will force sector 42 to the right until spring 41 passes to the right of pivot 39 so that sector 42 will be snapped to the right until lug 46 strikes arm 36 and forces it against stop 40 thereby breaking the heating circuit.

The lost motion connection of sector 42 with arm 36 allows the heating circuit to remain closed until the spring is moved over the pivot point of arm 36 and sector 42. Support 49 may be rotatable so that position of strip 48 relative to sector 42 may be adjusted. The contact 32 may be placed at a greater arcuate distance from a perpendicular cross line through pivot 39 than stop 40, so that once the switch is closed, the momentum of weight 47 will not be sufficient to open it, although the momentum in the opposite direction will be enough to close it. Holes 50 for attaching the cover and handle may be provided as in Figure 1.

In Figure 3 the iron has handle 51 attached to cover 52 which has slot 53 for lever arm 54 and slots 55 and 56 for legs 57 and 58 respectively. Leg 57 is pivoted to the cover or to the sole plate 60 by pivot 59 and leg 58 is similarly pivoted by pivot 61. Link arm 62 is pivoted to a branch of leg 57 at 63 and to lever arm 54 by pivot 64. Arm 54 is pivoted to support 65 by pivot 66. Support 65 is fastened to plate 67 containing a suitable electrical heating element and has offset extension 68 to which catch 69 is pivoted at 70. Spring 71 normally urges catch 69 in downward direction against a suitable stop. Bent arm 72 is integral with catch 69 and is positioned to be struck by weight 73 fastened to arm 74 which is attached to shaft 75 having bearing in escapement controlled or other time switch 76 fastened to plate 67 or to any suitable part of the iron. This time switch may be similar to that shown and described in my above mentioned co-pending application. Spring 77, attached to support 68 and to arm 74 tends to pull this arm to the left, the rate of movement being controlled by an escapement or other delaying means.

Link arm 78 is pivoted to arm 54 at 79 and to arm 80, integral with leg 58, at 81. Notched arm or hook 82 is integral with arm 54 and is normally held in the position shown by catch 69.

Connection plug 83 is fastened to the iron, and wire 84, properly insulated, makes connection with a switch contact in switch 76, through thermostat 85. The other switch contact is connected to wire 86 leading to the heating element. Likewise, wire 87 leads from plug 83 to the other terminal of the heating element. Tension spring 88 is connected between arm 54 and plate 67 or other part which may be of any desired thickness or weight. This plate is screwed to or otherwise fastened to sole plate 60, or it can be held by pressure. Spring 88 could of course be attached to cover 52 or some other part.

In operation, as long as the iron is used, the movement keeps weight 73 thrown back out of contact with arm 72, a ratchet being provided to allow free movement of weight 73 in the rearward direction, against the tension of spring 77, but causing the weight to be delayed in forward direction by means of an escapement or other time delay means. Therefore as long as the iron is used the legs 57 and 58 remain folded within the iron casing as shown.

If, however, the iron is left stationary for a period longer than a predetermined interval, determined by the tension of spring 77 and the escapement, weight 73 will be pulled forward in a circular path by spring 77 and will strike arm 72 which lifts catch 69 and releases lever arm 54 which is quickly pulled to the left by spring 88. When this happens, legs 57 and 58, through linkages 62 and 78, are rotated outward about pivots 59 and 61 and are brought down to positions below sole plate 60. This immediately lifts sole plate 60 above the cloth or other supporting surface so that burning or scorching will be prevented or reduced.

Leg 58 can be wide or pivot 61 can extend across to another similar leg so that there will be a three point support for the iron. The ends of the legs can be rounded so they will not damage the cloth.

When it is desired to re-set the iron it is lifted and lever 54 is pulled back. When this happens arm 89, pivoted to lever 54 at 90, strikes weight 73 and throws it back to the rear. Then catch 69 will engage hook 82 and legs 57 and 58 will have been pulled back into the iron, around pivots 59 and 61, by linkages 62 and 78.

Legs 57 and 58 may be of any desired shape and may be placed in any desired locations. They may be arranged to slide out of the iron along linear paths if desired. Thermostat 85 can be used to prevent the iron from overheating in use.

This iron therefore both cuts off the current and lifts the hot sole plate above the supporting surface, if it is left stationary too long in ironing position. The time switch, however, keeps the heating circuit closed for brief periods of rest so that the contacts will not be constantly arcing.

In Figure 4 handle 91 is attached to iron cover 92 to which are fastened bottom lugs or plates 93, by means of screws preferably. Relatively heavy metal plate 94, containing a suitable heating element which may be detachable, is provided with shoulders 95 which strike plates 93 when compression springs 96, fastened to or guided by cover 92 in any suitable way, push against flanges 97 to lift cover 92 and plate 94. These flanges are integral with rods 98 which are slidable in guide openings in plate 94. Springs 96 surround the upper ends of rods 98 as shown. Sole plate 99 is fastened to the lower ends of rods 98. This plate is preferably made rather thin so that it will cool quickly when separated from plate 94.

Plate 94 may be rather solid with an imbedded heating unit or it can be made of two or more plates bolted or screwed together, with a heating unit between. Likewise, the heating wires could be placed in grooves in the bottom of plate 94 which could be of fire resistant ceramic material. It would be preferable to have mica between the heating wire and the sole plate.

Time delay switch 100, shown diagrammatically, may be of the same general type as disclosed in my co-pending application, Serial No. 446,685, filed June 12, 1942. This switch has weight 101 fastened to the lower end of arm 102 which is fastened to shaft 103 having bearing in the switch or casing. As shown in the prior application, although in reverse direction, weight 101 will be moved against the tension of spring 104 which is fastened to arm 102 and to the switch casing, when the iron is accelerated forward and when the iron is stationary or is accelerated in reverse direction weight 101 will act against a retarding escapement so that spring 104 will pull arm 102 slowly in clockwise direction to close a pair of contacts to which wires 107 and 108 lead. Wire 108 leads also to a terminal of the heating element in plate 94, through thermostat 109 and wire 107 is connected with terminal plug 110 fastened to the iron. Wire 111 connects the other terminal of the heating element with the remaining terminal of plug 110.

Latch 112, pivoted to the casing of switch 100 at 113 is normally held down against stop 114 on the casing of the switch by means of compression spring 115 connected between lower arm 116 of the latch and a support point on switch 100.

The inset surfaces of the ends of plate 94 are vertically slidable relative to plates 93 so that when handle 91 is pressed down to compress springs 96 and to slide plate 94 downward relative to rods 98, a left flange 97 lifts latch 112 which is then pressed up against the flange by springs 96 acting against cover 92. The sliding movement of plate 94 insures that sole plate 99 will be pulled up tightly against heating plate 94 since springs 117 press plate 94 downward but allow latch 112 to pass under flange 97 and thus to hold sole plate 99 yieldingly in contact with heating plate 94. When the handle is released the springs 117 force heating plate 94 tightly against sole plate 99. The heat conduction will then be good and the iron can be used.

Latch 112 has an inclined surface so that it will be moved to the right when flange 97 strikes it from underneath.

In operation, if the iron gets too hot, thermostat 109 will break the circuit and if the iron is left stationary and in ironing position longer than a certain time interval, weight 101 will be pulled in clockwise direction, against the controlling escapement or other device, and will strike arm 116. When this happens latch 112 is moved to the right, away from flange 97, and springs 96 quickly lift cover 92, plate 94 and attached parts upward until the top surface of plate 94 strikes the under surfaces of flanges 97, as illustrated. In this position sole plate 99 is separated from heating plate 94 and the thin sole plate will quickly cool. Rods 98 can be of poor heat conductivity metal such as some grades of steel or they can be of nonmetallic material.

Switch 100 cuts off the current in wires 107 and 108 when weight 101 strikes arm 116, in similar manner to that described in the above mentioned application.

As long as the iron is kept in movement weight 101 is kept thrown away from arm 116 so that sole plate 99 is held against heating plate 94 but if for any reason the iron is forgotten or neglected for a period longer than an interval which may be settable, the hot iron is lifted above the sole plate to prevent burning and at the same time, the heating circuit is opened.

Latch 112 or a similar latch can also be arranged to be pressed against flange 97 at the rear, to prevent binding.

Sole plate 99 can be pivoted to linkages which may be pivoted to the sides or in grooves in plate 94 so that a swinging or rotary movement will lift the iron above the sole plate. Many other changes of detail can be readily made.

In Figure 5 the casing 118 of the iron connection plug shown is preferably made of heat resistant electrical insulating material. Weight 119 is fastened to arm 120 which is pivoted to the casing at 121. Tension spring 122 is fastened to arm 120 and to some part of the plug such as metallic connector 123 adapted to make electrical connection with a terminal of an electric iron. A similar connector is placed on the cut-away side of the plug for connection with the other heating unit terminal of the iron.

Conductor 124 of the iron connection cord is brought into the plug through opening 125 and is electrically connected to the connector not shown. The other cord conductor 126 is connected to switch contact 127 fastened to the casing. Metallic arm 120 is provided with switch contact 128 which closes the heating circuit by touching contact 127 when weight 119 is thrown to the left to carry spring 122 past pivot 121.

In the open circuit position shown, arm 120 rests against stop 129 projecting from the casing. This stop is preferably of such length that arm 120 is positioned just slightly past the vertical, so that excessive momentum will not be required to throw weight 119 forward to close the heating circuit. Contact 127, however, is positioned so that spring 122 will be well to the left of pivot 121 so that the rearward movement and stopping of weight 119, during ironing, will not open the switch. If, however, the iron overheats, beyond a predetermined temperature rise, the heat will be transmitted to thermostatic bimetal strip 130 fastened to casing 118 by a screw or otherwise, so that it will bend to the right and will force arm 120 to the position shown, resting against stop 129, with the heating circuit open. The circuit will remain open unless the iron is given normal movement as in use, in which case weight 119 will be thrown to the left by the momentum, to close the heating circuit through contacts 127 and 128 and spring 122 if the iron has in the meantime cooled sufficiently to allow strip 130 to bend back to the left a sufficient distance.

The section 131 of the casing may be made of metal and may be so designed that it will come into contact with a hot surface of the iron, to facilitate transfer of heat to the bimetal 130.

This connection plug can be adapted for use with many different types of electric irons and will provide an automatic cut-off feature for the heating element, if the iron is not used. This device can be placed in the cord circuit at any position where it will be given movement but if separated from the iron a timing switch such as switch 100 of Figure 4 should be used since this switch is not dependent upon the temperature of the iron for operation.

In Figure 6, roller 132 is a metal cylinder fastened to the end of switch arm 133 by means of screw 134 which passes through a central hole in the roller and is threaded into the end of arm 133. This roller is supported by track 135 which may be any suitable surface of the iron. By this construction roller 132 may be quite heavy, in order to furnish considerable momentum to close the switch when the iron is used, but its weight will be supported and it will not tend to bend the switch arm or produce excessive friction.

In Figure 7 switch casing 136 is preferably of non-conducting plastic material or of porcelain or the like. It may be split and the parts joined by bolts. Switch arm 137 carrying ratchet pawl 138, is pivoted to the casing by pivot 139 and coiled spring 140, attached to arm 137 and to the casing, urges the arm in clockwise direction. Gear 141 having bearing on stub shaft 142 one end of which is screwed or otherwise fastened to casing 136, is placed adjacent a side wall of the casing and is provided with suitable indentations 143 which may be engaged by ratchet 138 to rotate gear 141 in clockwise direction. Ratchet 138 allows free movement of arm 137 in counter clockwise direction against the torsion of spring 140. Gear 141 is meshed with pinion 144 rotatable around a suitable stub shaft along with attached star wheel 145 which engages pivoted escapement or verge 146 which limits the rate of movement of arm 137 in clockwise direction.

Flexible metal switch contact 147 is fastened to casing 136 and is connected to one of the conductors in iron cord 148. The other conductor is connected to conductor 149 which is connected to a conductor in iron cord 150 at the opposite end of casing 136. The other conductor of cord 150 is connected to metal arm 137 through conductor 151 which may be suitably insulated if desired.

Metal ball 152 is adapted to roll on an inner surface of the switch and if the iron cord is given normal movement this ball will oscillate and will strike arm 137 with the result that this arm will be pushed into contact with flexible strip 147 with a certain amount of overlap. When this happens the circuit supplying energy to the heating element of the iron will be closed through conductor 151, spring 140, arm 137 and strip 147.

As long as the iron is kept in use the rolling action of ball 152 will keep arm 137 in contact with strip 147 but if the iron is left stationary for an interval greater than a predetermined amount, depending upon the overlap, the tension in spring 140, and the escapement, then arm 137 will be slowly rotated in clockwise direction until it is out of contact with strip 147 and the circuit will be broken.

It is obvious that many detailed changes can be made. For instance, ball 152 could be attached to arm 137 or it could be designed to be effective when moved in any direction, by means of universal connections.

What I claim is:

1. An electric iron comprising, an ironing element, a heating element therefor, a handle, a switch for opening and closing a circuit including said heating element, snap-acting spring-operated means for holding said switch closed or open, an iron-motion-responsive weight for moving the snap-acting means to close said switch, and time-delay means for moving the snap-acting means to open said switch.

2. An electric iron comprising, an ironing element, a heating element therefor, a handle, a switch for opening and closing a circuit including said heating element, snap-acting spring-operated means for holding said switch closed or open, a rollable element responsive to movement of said iron for moving the snap-acting means to close said switch, and time-delay means for moving the snap-acting means to open said switch.

3. An electric iron comprising, an ironing element, a heating element therefor, a handle, a switch for opening and closing a circuit including said heating element, snap-acting spring-operated means for holding said switch closed or open, a ball responsive to ironing movement of said iron for moving the snap-acting means to close said switch, and time-delay means for moving the snap-acting means to open said switch.

4. An electric iron comprising, an ironing element, a heating element therefor, a handle, a switch for opening and closing a circuit including said heating element, snap-acting spring-operated means for holding said switch closed or open, a ball responsive to ironing movement of said iron for moving the snap-acting means to close said switch, means for guiding movement of said ball, and time-delay means for moving the snap-acting means to open said switch.

5. An electric iron comprising, an ironing element, a heating element therefor, a handle, a switch for opening and closing a circuit including said heating element, snap-acting spring-operated means for holding said switch closed or open, an iron-motion-responsive weight for moving the snap-acting means to close said switch, time-delay means for moving the snap-acting means to open said switch, and means for adjusting said time delay means for various delay periods.

6. An electric iron comprising, an ironing element, a heating element therefor, a handle, a switch including a resilient contact member for opening and closing a circuit including said heating element, snap-acting spring-operated means for holding said switch closed or open, an iron-motion-responsive weight for moving the snap-acting means to close said switch, and time-delay means for moving the snap-acting means to open said switch.

7. An electric iron comprising, an ironing element, a heating element therefor, a handle, a switch including a pivoted arm for opening and closing a circuit including said heating element, snap-acting means including a pivoted member and a spring for holding said arm in closed-switch or open-switch position, said pivoted member including a pair of separated elements for striking said arm on opposite sides thereof, an iron-motion-responsive weight for moving said arm to close said switch and to cause said pivoted member to maintain said switch closed, and time delay means for moving said pivoted member to move said arm to open-switch position and to maintain said switch open.

8. In an electric iron, a heating element, a switch for opening and closing a circuit including said heating element, snap-acting spring-operated means for holding said switch closed or open, an iron-motion-responsive weight for moving the snap-acting means to close said switch, and time-delay means for moving the snap-acting means to open said switch.

ALBERT G. THOMAS.

REFERENCES CITED

The following references are of record in the file of this patent:

UNITED STATES PATENTS

| Number | Name | Date |
|---|---|---|
| 1,366,480 | Balda | Jan. 25, 1921 |
| 1,422,224 | Poole | July 11, 1922 |
| 1,607,551 | Mailey | Nov. 16, 1926 |
| 1,659,636 | Null | Feb. 21, 1928 |
| 2,143,701 | Kelly | Jan. 10, 1939 |
| 2,219,506 | Steimel et al. | Oct. 29, 1940 |
| 2,382,587 | Thomas | Aug. 14, 1945 |